(footnote

United States Patent

Horvath et al.

[15] 3,647,523
[45] Mar. 7, 1972

[54] COATED CHLORINE-GENERATING MATERIALS FOR TREATING FLUIDS

[72] Inventors: Roland J. Horvath, South Euclid; Charles G. Parsons, Mentor, both of Ohio

[73] Assignee: Diamond Shamrock Corporation, Cleveland, Ohio

[22] Filed: Aug. 28, 1969

[21] Appl. No.: 853,967

[52] U.S. Cl. ................117/100 B, 23/86, 117/161 UA, 117/168
[51] Int. Cl. ..................................C01b 11/06
[58] Field of Search........117/161 UA, 100 B, 123 D, 123 E, 117/138.8 UA, 168; 23/86

[56] References Cited

UNITED STATES PATENTS

| | | | |
|---|---|---|---|
| 2,348,039 | 5/1944 | Ulrich et al. | 117/161 X |
| 2,646,343 | 7/1953 | Bennett et al. | 117/100 X |
| 2,811,417 | 10/1957 | Matarese et al. | 23/86 |
| 2,853,465 | 9/1958 | Werner | 117/161 X |
| 2,926,107 | 2/1960 | Hill | 117/168 X |
| 3,104,934 | 9/1963 | Blumenkopf | 117/138.8 X |
| 3,132,074 | 5/1964 | Sverdes | 117/161 X |
| 3,507,686 | 4/1970 | Hagenbach | 117/100 |

FOREIGN PATENTS OR APPLICATIONS

| | | | |
|---|---|---|---|
| 639,063 | 3/1962 | Canada | 23/86 |

*Primary Examiner*—William D. Martin
*Assistant Examiner*—Mathew R. P. Perrone
*Attorney*—Roy Davis, C. Thomas Cross, Timothy E. Tinkler, John J. Freer, Sam E. Laub, Neal T. Levin, Leslie G. Nunn, Jr., Helen P. Brush and John C. Tiernan

[57] ABSTRACT

Coatings for chlorine-containing compositions which control the rate of chlorine release from the composition when contacted with fluid medium, minimize the release of noxious chlorine odors to the atmosphere and improve the storage of the composition. The coating is established on the chlorine-containing composition by contacting the composition with a solution of the coating agent and allowing the coating agent to air dry on the composition.

8 Claims, No Drawings

COATED CHLORINE-GENERATING MATERIALS FOR TREATING FLUIDS

BACKGROUND OF THE INVENTION

1. Field of the Invention

This invention relates to coatings for chlorine-containing compositions and more particularly concerns a coating system which covers and/or impregnates chemicals capable of releasing chlorine in controlled dosages in a fluid medium when the chemicals are contacted by a fluid medium.

2. Description of the Prior Art

A wide variety of chemical compositions capable of releasing chlorine when contacted with fluid media have been proposed and utilized in such media. Various configurations or shapes of the chemical compositions have been employed including stick forms, granules, tablets, pills, pellets, briquettes and the like. The various aforementioned configurations, including the stick shape, may contain varying but predetermined amounts of a solid compound capable of releasing available chlorine when contacted with fluid. Such configurations generally contain predetermined amounts of available chlorine, usually provided by a chlorinated cyanuric acid compound, or calcium hypochlorite, and may vary in size and/or configuration depending upon the use of the particular composition. However, the use of these various aforementioned configurations of chemical compositions in the treatment of fluid media has involved definite disadvantages. Included in the disadvantages of the prior practice was the fact that the rate of dissolution of the chemical composition into the fluid medium was random, chiefly being controlled by the solubility of the chemical in the fluid medium being treated along with the erosive action of the flow of the fluid medium.

An additional disadvantage to the use of chlorine-generating chemicals, especially in units vented to the atmosphere, has been the chlorinous odors given off to the atmosphere which are offensive to people in the vicinity of the treatment area. The discomfort caused to maintenance personnel for sewage treatment units from the chlorinous odors can be very pronounced. Shipment and handling of the various configurations or shapes of chlorine-generating compositions result in chipping away of fragments and grinding of the fragments to a dust which generally is left in the shipping container or vehicle. If this powder is poured into the fluid medium, there is a rapid release of the chlorine into the fluid medium as opposed to a gradual erosion of the chemical from a solid shape. Further, the chlorine-generating compositions, upon exposure to the atmosphere would have absorption of moisture and carbon dioxide from the atmosphere which would result in caking of the composition and the release of some chlorine from the composition, thus reducing the effectiveness of the composition ultimately being used to treat the fluid medium due to loss of the chlorine.

SUMMARY OF THE INVENTION

The foregoing disadvantages of the prior art practice of chlorinating fluid media are overcome through the practice of the present invention of establishing a coating on the various configurations of chemical compositions utilized in chlorinating fluid media.

It is an object of this invention to provide chemical compositions for chlorinating fluid media which have a controlled rate of dissolution of the chlorine-containing chemical component upon contact with the fluid medium which is not solely dependent on the solubility of the composition in the fluid medium. Another object of this invention to provide chemical compositions for chlorinating fluid media which will substantially prevent the release of any chlorinous odors upon contact of the chemical with the fluid media. A further object of this invention is to provide a protective coating for chemical compositions which will prevent or reduce the chipping of shaped forms of the chemical and reduce the production of fines due to abrasion of the surfaces of the shaped forms of the chemical. An additional object of this invention is the coating of shaped forms of the chemical to lessen the absorption of moisture and carbon dioxide by the chemical upon exposure to the atmosphere prior to being consumed by the fluid media during treatment. Other objects and advantages of this invention will be apparent from the following specification and the appended claims.

DESCRIPTION OF THE PREFERRED EMBODIMENTS

The foregoing objects of the invention are realized by establishing a substantially uniform coating on a chlorine-containing chemical composition which coating is not reactive with the chemical substrate being coated. This results in a chemical composition as a substrate, the surfaces of which have thereon a substantially evenly distributed coating. Where desired, the coating material may be impregnated into the chemical substrate by using a penetrating solvent to carry the coating substance into the pores of the chemical composition and upon evaporation of the solvent the coating material is deposited on the inner surfaces forming the pores of the chemical composition.

The coatings can be applied by a number of procedures among which are dipping the substrate to be coated into a solution of the coating material, spraying the substrate with a solution of the coating material and depositing the coating by vapor deposition on the substrate to be coated. For the dipping and spraying procedures, a 2 to 5 percent by weight solution of the coating agent in a suitable solvent is employed. After dipping the substrate in this solution or spraying this solution on the substrate, the solvent evaporates leaving the coating agent on the substrate and impregnated into the pores of the substrate. The solvent is selected so that the chlorine-containing substrate is not soluble in the solvent or reactive with the solvent. It is also preferable to have a solvent rapidly evaporating from the substrate. Exemplary of suitable solvents are the alkylene chlorides including methylene chloride, carbon tetrachloride, chlorinated ethylenes such as ethylene dichloride, 1,1,2-trichloro-1,2,2-trifluoroethane, 1,1,1-trichloroethane, chloroform trichloroethylene and perchlorethylene. Vapor deposition is accomplished by exposing the surfaces of the substrate to an atmosphere of vaporized coating agent for a sufficient period of time to enable the desired deposition on the substrate of the coating agent.

The constitution of the coating agent is selected for its properties as a coating on the chlorine-containing substrate including imperviousness to chlorinous vapors (thus substantially entrapping these vapors in the substrate until dissolved in the fluid media); the tensile strength of the coating on the substrate and its resistance to failure under applied forces (these properties should be high so that chipping of shaped forms and the production of fines from abrasion are substantially reduced); the solubility of the coating in the fluid medium to be treated should be within desirable ranges so the coating is not rapidly dissolved but allows controlled dissolution of the substrate; and the coating agent should not appreciably absorb moisture and carbon dioxide. Among the suitable compounds are the liquid and resinous chlorinated paraffins containing from 40 to 70 percent chlorine, by weight, including CHLOROWAX-40 and CHLOROWAX-70 which are chlorinated microcrystalline paraffin waxes having chlorine contents of 40 percent by weight and 70 percent by weight respectively, and polyvinylpyrrolidone, e.g., PVP K-30 having an average molecular weight of 40,000. While coating weights up to 5 percent by weight of the substrate being coated have been made, it is preferred to have coating weights up to 0.5 percent by weight of the substrate being coated to achieve the maximum qualities of the desired results of these coatings as previously listed. Coating weights can be varied from about 0.08 percent to about 5.0 percent by weight of the substrate being coated. The coating weight is the weight of the dry film-forming components.

As previously stated, the compositions to be coated are the chlorine-containing compositions utilized to treat fluid media, representative of which are the metallic hypochlorites with particular emphasis on the alkaline earth metallic hypochlorite compound and particularly calcium hypochlorite, the chlorinated triazines, the chlorinated cyanuric acids, the chlorinated isocyanuric acids, the chlorinated melamines, the chlorinated hydantoins, the chlorinated glycolurils and any combination(s) of the foregoing compositions.

The coated chlorine-containing compositions of this invention in the various forms or shapes in which they can be utilized, including granules, stick shapes, tablets, pills, pellets, briquettes, and the like, may be used in any apparatus or device which promotes the treatment of fluid media with these compositions when subjected to the erosive or disintegrating action of the fluid media. Typical of the fluid media for which the coated chlorine-containing compositions of this invention may be utilized are water or other aqueous media, aqueous sewage sources, aqueous plant effluents and gaseous media capable of reacting with the chlorine component of the composition. Also representative of the applications of the coated compositions of this invention are the treatment of water in swimming pools and other water circulation systems. Further utilization of appropriate coated chlorine-containing compositions of this invention are for bleaching, sterilizing and disinfecting applications.

The coated chlorine-containing compositions of this invention in the various forms listed above are surprisingly resistant to the loss of available chlorine in the compositions for long periods of time when stored in an air atmosphere, even under high temperatures (up to 125° F.) and high humidity (up to 99 percent). This results in more available chlorine in the composition at the time of contact by the fluid medium. This prevents undertreatment of the fluid medium with chlorine such as could happen with a composition contaminated by moisture thus having less available chlorine than initially present in the composition. The coatings of this invention also stop the loss of available chlorine in the compositions coated when such compositions are placed in the proximity of the flowing fluid source and the compositions are left to stand or are permitted to stand for some period of time before and during use.

In the past, disinfectant compositions (in powder, tablet, pellet, granular, etc., forms) were unsatisfactory in supplying available chlorine to aqueous media because the dissolution or erosion rates gave an erratic supply of released chlorine. Specifically, and stated in other words, if, for example, a composition in powdered, granular or tablet form was contacted with the aqueous medium, the composition would dissolve rapidly thereby releasing all the available chlorine to the aqueous medium. The present invention yields satisfactorily coated compositions having unique solubility, dissolution and erosion rates in fluid media whereby there is a constant and/or controlled amount of available chlorine dissolved in the media at a predetermined, desired rate, as a function of the flow rate of the media, as in the water of a swimming pool or the water flowing out of a sewage treatment plant.

A further understanding of this invention will be obtained from the following specific examples which are intended to illustrate the invention but not to limit the scope thereof, parts and percentages being by weight unless otherwise indicated.

EXAMPLE 1

Preparation and Application of Coating to a Chlorine-Containing Substrate

A solution is made by dissolving 10 g. of CHLOROWAX-70 (chlorinated microcrystalline paraffin wax) in 200 ml. of methylene chloride with occasional stirring to help dissolution of the CHLOROWAX-70 into the methylene chloride. Six tablets of calcium hypochlorite weighing 127 g. each and having a diameter of 2-⅝ of an inch and a thickness of thirteen-sixteenths of an inch are dipped for 15 seconds each in the solution. Each tablet is then removed, drained over the solution container, and dried in a stream of air at room temperature. The net loss of solution volume into the six tablets after dipping is determined to be 30 ml. The amount of solution absorbed by each tablet is approximately 5 ml., which is equal to 0.25 g. of coating agent added to each tablet. Weighing of the tablets before and after coating confirmed this weight gain. The average coating on each tablet is calculated to be 0.197 percent by weight based on the tablet weight of 127 g.

EXAMPLE 2

Preparation and Application of Coating of Polyvinylpyrrolidone

Six tablets of calcium hypochlorite weighing 127 g. each and having a diameter of 2-⅝ inches and a thickness of thirteen-sixteenths inch are used in this experiment. Solution is prepared consisting of 200 ml. of methylene chloride into which is dissolved 10 g. of polyvinylpyrrolidone (Antara PVP K-30 GAF Corporation) at room temperature. The tablets are dipped into the solution for 15 seconds each. Each tablet is removed in turn, drained over the solution container, and dried in an air stream at room temperature. The net loss of solution volume into the tablets after dipping is 24 ml. and the amount of solution absorbed by each tablet is 4 ml., which is equal to an added coating weight of 0.20 g. Weighing of the tablets both before and after the dipping confirmed this weight gain. The average coating on each tablet is calculated to be 0.157 percent based on the tablet weight of 127 g.

EXAMPLE 3

Laboratory Dissolving Rate Studies

Dissolving rate tests on the coated tablets have been made for comparison with their uncoated counterparts to determine the control resulting from the application of the coating agent on the tablets. These studies were conducted in a laboratory dissolver system consisting of a dissolver trough about 6 inches wide and 15 inches long and approximately 3 inches deep. At the exit end was a weir plate having a rectangular weir measuring 1 inch in width by 3 inches in height extending from the floor of the dissolver located approximately in the center of the weir plate. A feed tube having a 3-⅛ inches inside diameter and 12 inches in height made of polyvinyl chloride plastic for holding the tablets was placed in the dissolver 3 inches forward from the weir exit. The tube was submerged to within one-eighth inch of the floor of the dissolver. The tablets were placed in the tube and tap water was passed through the dissolver at a rate flow of 4 gallons per minute. Effluent from the dissolver was analyzed for available chlorine content over a period of 4.5 hr. (270 min.) by standard iodometric methods. All the tablet batches were run consecutively under identical conditions. Analysis of the available chlorine delivered to the aqueous -⅛ showed that after the initial 10 minutes, the delivery was consistent for the remainder of the test period. Comparisons of the coated and uncoated tablets were made and the percent reduction of chlorine delivery was determined, which results are shown in Table 1. The following table has the run numbers in the first column, the second column has the chemical constitution of the tablet being tested, the third column has the constitution of the coating of the tablet, the fourth column has the percent by weight of the coating on the tablet, the fifth column has the average chlorine delivery in parts per million, the sixth column has the percent reduction in chlorine delivered. In explanation of the last column, the uncoated tablet used for Run No. 1 is considered a 0 percent reduction and compared with the results for Run Nos. 2 through 5; the same practice is used for Run No. 6 in comparison with Run No. 7 and Run No. 8 in comparison with Run No. 9.

TABLE 1

| | | | | Average Cl | |
| Run No. | Type tablet | Coating | Percent coating | delivered, p.p.m. | Percent reduction |
| --- | --- | --- | --- | --- | --- |
| 1 | Ca(OCl)$_2$ | None | 0.0 | 12.2 | 0 |
| 2 | Ca(OCl)$_2$ | Chlorowax-70 | 0.079 | 11.5 | 5.7 |
| 3 | Ca(OCl)$_2$ | do | 0.118 | 10.2 | 16.4 |
| 4 | Ca(OCl)$_2$ | do | 0.197 | 5.5 | 54.9 |
| 5 | Ca(OCl)$_2$ | do | 0.219 | 4.2 | 70.1 |
| 6 | Ca(OCl)$_2$ | None | 0.0 | 14.1 | 0 |
| 7 | Ca(OCl)$_2$ | Polyvinyl-pyrrolidone. | 0.157 | 5.6 | 54.1 |
| 8 | Ca(OCl)$_2$ plus 5% dichloro-glycoluril. | None | 0.0 | 15.1 | 0 |
| 9 | do | Chlorowax-70 | 0.156 | 10.6 | 29.8 |

This shows that both the CHLOROWAX-70 and polyvinylpyrrolidone as a coating successfully control the rate of dissolution of the chlorine from the tablets tested.

EXAMPLE 4

Containment of Noxious Odors

The comparison of noxious odors of chlorine-containing materials was determined in this test by attempting to smell any odors given off when exposed to the atmosphere under various conditions of humidity. Tablets composed of calcium hypochlorite containing a five percent additive of tetrachloroglycoluril and tablets composed of calcium hypochlorite containing a five percent additive of dichloroglycoluril initially gave off a strong chlorinous odor when exposed to the air. This odor was quite noticeable to the laboratory observers. Tablets containing 5 percent tetrachloroglycoluril additive to calcium hypcochlorite, when coated with 0.156 percent CHLOROWAX-70 based on the tablet weight as shown in Example 1, had no chlorinous odor detactable by the laboratory observers when exposed to the air. Tablets containing five percent dichloroglycoluril in calcium hypochlorite, when coated with 0.113 percent CHLOROWAX-70 based on tablet weight, had no chlorinous odor detectable to the laboratory observers when exposed to the atmosphere.

EXAMPLE 5

Prevention of Adsorption of Moisture and Carbon Dioxide

Two series of tablets composed of calcium hypochlorite and two series of tablets of calcium hypochlorite with a 5 percent additive of tetrachloroglycoluril and two series of tablets of calcium hypochlorite with a five percent additive of dichloroglycoluril are made. One series of tablet is coated with CHLOROWAX-70 as described in Example 1, and all tablets are exposed to air at normal temperatures for 16 days. The uncoated tablets develop a rough surface, take on a chalky appearance, and the surface disintegrates producing flakes of chemicals. This is due to the adsorption of water and/or carbon dioxide and is a sign of degradation of the tablet surface. This begins within a period of 3 or 4 days. Tablets coated with CHLOROWAX-70 have no surface roughness or chalky appearance after a period of 15 to 16 days exposure and have exhibited no visible changes after 2 months exposure. In the foregoing it is obvious that the coatings of this invention enable exposure of the tablets to atmospheric conditions (moisture and/or carbon dioxide) without any substantial degradation of the chlorine content of the tablet.

EXAMPLE 6

Field Test

Field evaluation of tablets coated according to the teaching of this invention in comparison with uncoated tablets of the same chemical composition were conducted in two side by side chemical dissolvers. The dissolvers used are 28 inches in length (inlet to exit), 7 inches in width, 9 inches in height, with a weir opening located 3 inches from the outlet. Each weir opening was 1 inch wide with the weir consisting of a solid sheet of material of the dimensions of the dissolver unit except for the 1 inch opening, which 1 inch opening runs for the full 9 inches of the weir height. The weir opening causes an increase of one-fourth inch in water height within the dissolver for each 2 gallons per minute of increment in flow rate of the water. Tubular holding means are employed for holding the tablets in this test with each having 3-⅛ inches inside diameter, 3-½ inches outside diameter with 12 inches in height, with the lower 6 inches in height having a basketlike retainer with a strap network conforming to the shape of the cylinder for withholding the chemical agent in the tubular means but enabling the aqueous medium to contact any chemical agent held within the tubes. Two tubes are used in each dissolver and with one being located 2 inches toward the inlet from the weir opening and the other is 8 inches toward the inlet from the weir opening. The distance between the bottom-most tablet in the feed tube and the bottom of the dissolver is three-sixteenths inch.

A stream from a sewage treatment plant is exactly split in half by a flow proportioner, each dissolver receiving one of the resulting streams. The flow meter measures the flow rates through each side which is determined to be from 0 to 12 gallons per minute. The average daily flow was 5,000 gallons per through each dissolver. One dissolver receives tablets of calcium hypochlorite while another dissolver receives tablets of calcium hypochlorite coated with CHLOROWAX-70 as described in Example 1. Fifteen tablets are loaded into each feed tube in each dissolver. After 7 days, the tablets are removed and the amount of sanitizer is determined. The results of this test are set forth in Table 2 wherein the first column gives the run number, the second column gives the chemical composition of the tablet, the third column gives the percent by weight of coating added to the tablet, the fourth column gives the initial sanitizer charge in pounds, the fifth column gives the sanitizer consumption as the total pounds used and as pounds per day.

TABLE 2

| | Consumption of coated vs. uncoated tablets | | | | |
| --- | --- | --- | --- | --- | --- |
| | | Chloro-wax-70 coating, percent | Initial sanitizer charge, lbs. | Sanitizer consumption | |
| Run No. | Tablet type | | | Total lbs. used | Lb./day |
| 1 | Ca(OCl)$_2$ | 0.0 | 4.33 | 0.43 | 0.062 |
| 2 | Ca(OCl)$_2$ | 0.076 | 4.33 | 0.19 | 0.027 |

A typical reduction of coliform organisms obtained during this test is shown below:

| Sanitizer | Run No. 1 Uncoated Ca(OCl)$_2$ | Run No. 2 Coated Ca(OCl)$_2$ |
| --- | --- | --- |
| Initial *E. Coli*/100 ml. | 2.09×10$^5$ | 2.09×10$^5$ |
| Remaining *E. Coli*/100 ml. after: | | |
| at 1/2 min. | 7×10$^2$ | 2.4×10$^3$ |
| at 2 min. | 0 | 8×10$^2$ |
| at 5 min. | 0 | 0 |
| at 10 min. | 0 | 0 |
| at 30 min. | 0 | 0 |
| Dosage, p.p.m. Cl | 8.46 | 7.43 |

EXAMPLE 7

This example demonstrates that the coating controls the dosage and consumption from compositions formulated from calcium hypochlorite and tetrachloroglycoluril. It was performed under the conditions described in Example 6 above. Formulated tablets containing 95 percent by weight calcium hypochlorite and 5 percent by weight tetrachloroglycoluril are used. Twelve tablets of these are coated with CHLOROWAX-70 and compared with an equivalent number of uncoated tablets in the side-by-side dissolvers.

After several days, the tablets are removed and the amount of sanitizer consumed is determined. The results show that the coating controls the consumption and subsequent dosage of the sanitizer. In this example, the consumption of the coated tablets is 11.3 percent less than that of the uncoated tablets. See Table 3.

TABLE 3

Consumption of Coated vs Uncoated Formulated Tablets

|  | Tablet Type | |
| --- | --- | --- |
|  | Formulated, Coated | Formulated, Uncoated |
| Chlorowax-70 Coating, % | 0.140 | 0.0 |
| Days on Stream | 15 | 15 |
| Est. Daily Flow, g.p.d. | $5 \times 10^3$ | $5 \times 10^3$ |
| Initial Sanitizer Charge, lb. | 3.47 | 3.47 |
| Sanitizer Consumption |  |  |
| Total Used, lb. | 0.95 | 1.07 |
| Rate, lb./day | 0.063 | 0.071 |
| $ Available chlorine content | 77.1 | 77.1 |
| Rate, lb./day, available chlorine | 0.0485 | 0.0548 |
| Average dosage delivered, p.p.m. Cl | 6.43 | 7.14 |

The tablets give the following reductions of coliform organisms after one-half hour.

|  | Tablet Type | |
| --- | --- | --- |
|  | Formulated Coated | Formulated Uncoated |
| E. Coli/100 ml. remaining after: At 1/2 hr., 50% probability | 300 | 50 |

It is to be understood that although the invention has been described with specific reference to particular embodiments thereof, it is not to be so limited since changes and alterations therein may be made which are within the full intended scope of this invention as defined in the appended claims.

What is claimed is:

1. An improved solid calcium hypochlorite composition in the form of a coated shape wherein the shape is coated with from about 0.08 percent to about 5 percent by weight of a coating component selected from the group consisting of:
   a. liquid and resinous chlorinated paraffins containing from about 40 percent to about 70 percent by weight of chlorine, and
   b. polyvinylpyrrolidone.
2. The composition of claim 1 wherein the form of the coated shape is a tablet.
3. The composition of claim 1 wherein the form of the coated shape is a granule.
4. The composition of claim 1 wherein the coating component constitutes from about 0.08 percent to about 0.5 percent by weight of the composition.
5. The composition of claim 1 wherein the coating on the composition has in addition been impregnated into the composition.
6. The composition of claim 1 wherein the coating component is polyvinylpyrrolidone.
7. The composition of claim 1 wherein the coating component is chlorinated microcrystalline paraffin wax.
8. The calcium hypochlorite composition of claim 1 wherein the shape comprises a mixture of:
   a. calcium hypochlorite and
   b. a member selected from the group consisting of dichloroglycoluril and tetrachloroglycoluril.

* * * * *